United States Patent [19]
Fox

[11] 4,208,124
[45] Jun. 17, 1980

[54] APPARATUS FOR MAKING COLOR SLIDES FROM BLACK-AND-WHITE ART USING REGULAR AND COLOR FILM ROLLS

[76] Inventor: Robert W. Fox, 90 S. Fox Mill La., Springfield, Ill. 62707

[21] Appl. No.: 949,500

[22] Filed: Oct. 10, 1978

[51] Int. Cl.² .................. G03B 27/32; G03B 27/52; G03B 27/62
[52] U.S. Cl. .................. 355/32; 355/63; 355/71; 355/73; 355/74; 355/75; 355/101
[58] Field of Search .................. 355/32, 35, 74, 73, 355/75, 63, 71, 101; 354/4

[56] References Cited

U.S. PATENT DOCUMENTS

| | | | |
|---|---|---|---|
| 3,140,645 | 7/1964 | Block et al. | 355/101 X |
| 3,315,561 | 4/1967 | Boutigue | 355/71 X |
| 3,511,565 | 5/1970 | Harman, Jr. et al. | 355/75 X |
| 3,604,328 | 9/1971 | Nakagawa | 355/75 |
| 3,627,411 | 12/1971 | Nagel | 355/75 X |
| 4,003,653 | 1/1977 | Kelly | 355/32 X |

*Primary Examiner*—Richard A. Wintercorn
*Attorney, Agent, or Firm*—Ralph F. Staubly

[57] ABSTRACT

A platform-shaped device is designed to be placed over the illuminating aperture of a color-controllable light-box of known construction, and under a camera which is loaded with a roll of color film of slide-forming size and character, and which is focused on the central area of the platform. The device has at opposite sides a reel for holding, guidedly feeding and receiving a roll of developed black-and-white negatives previously made from the usually much larger black-and-white art work. The device also has means (e.g. a geneva-movement mechanism) for accurately sequentially positioning in the camera field, each one of a series of frames to be converted to color-slide frames in the camera. A pair of laterally movable thin blackened masking plates are manually movable in guides to expose different laterally constricted areas of the negative for each color to be projected therethrough from the light-box. Another pair of thin blackened masking plates are also provided for horizontal fore-aft movement to expose areas constricted at right angles to those exposed by the laterally movable plates.

10 Claims, 7 Drawing Figures

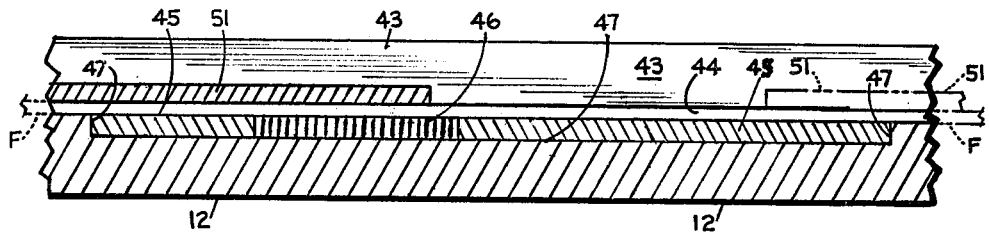
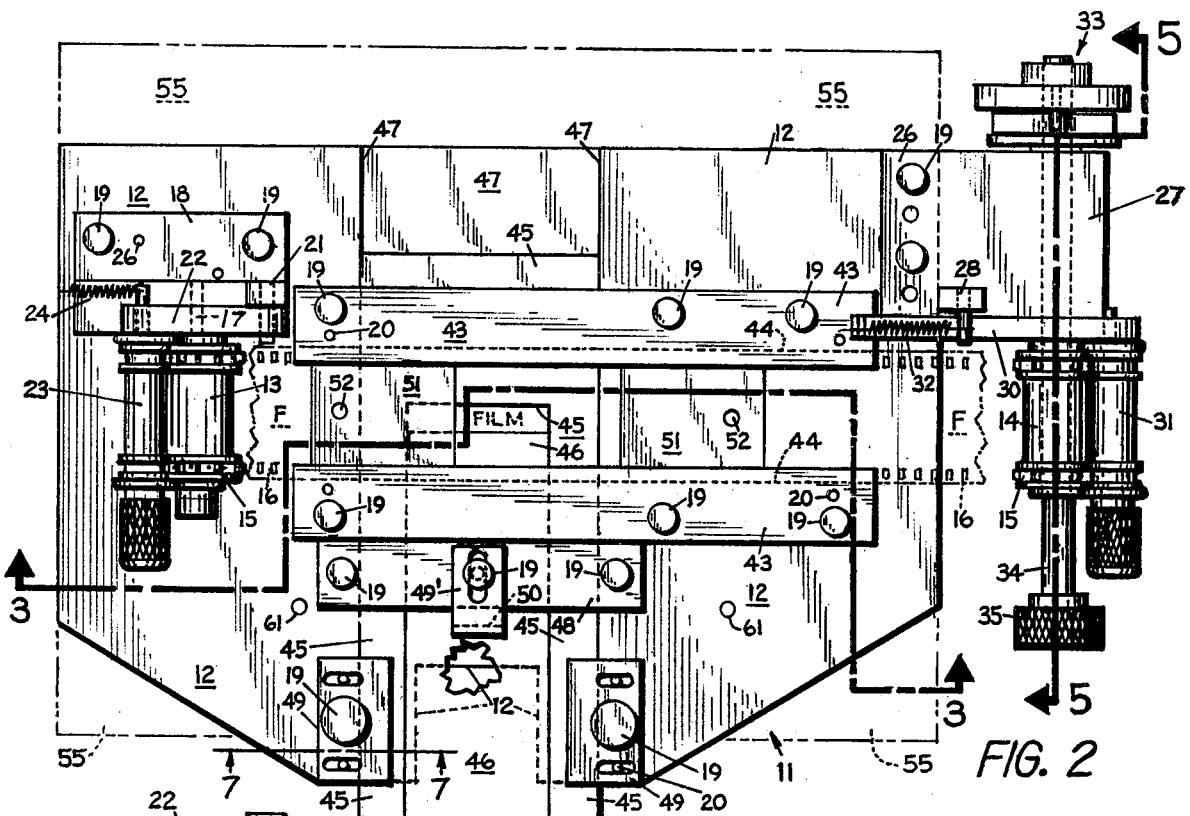
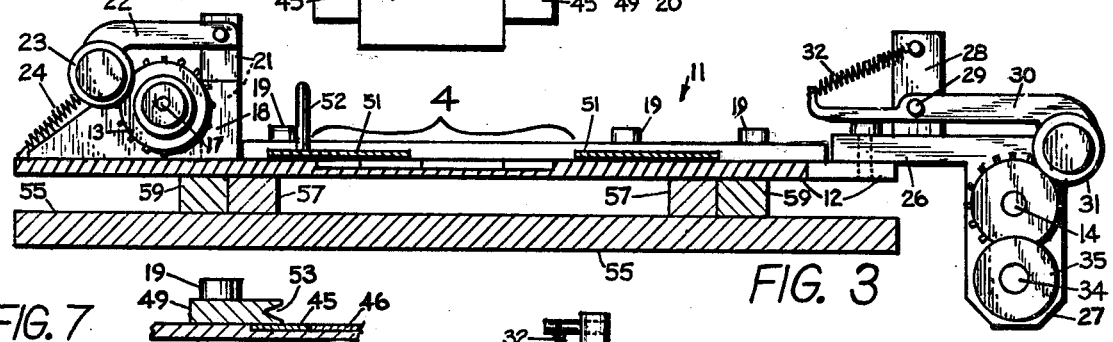
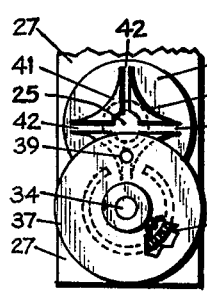
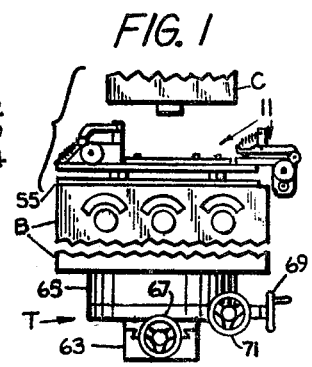

APPARATUS FOR MAKING COLOR SLIDES FROM BLACK-AND-WHITE ART USING REGULAR AND COLOR FILM ROLLS

BACKGROUND AND OBJECTS OF THE INVENTION

U.S. Pat. No. 4,003,653 (Kelly) teaches making color slides using black-and-white art work and a camera loaded with slide-size color film. Large negatives are made from the art work and are accurately centered over the light aperture of a color-variable light box. Different areas of the large negative are sequentially exposed to different-colored lights through openings formed by blackout masks, and are sequentially photographed on the same slide frame in the camera to produce a several-color slide. The apparatus of the patent, while effective, is not capable of an "assembly-line" type of production of rolls of slides from rolls of negatives, a commercially desirable capability which is the principal object of the present invention. Other objects and advantages will appear as the following detailed description proceeds.

BRIEF DESCRIPTION OF THE DRAWINGS

FIG. 1 is a front elevational schematic view showing a typical use with a camera and a light box.

FIG. 2 is a plan view of a preferred embodiment of the invention.

FIG. 3 is a front elevational view of the device of FIG. 2 in section taken on the line 3—3 of FIG. 2.

FIG. 4 is an enlarged fragmentary front elevational view of the portion of FIG. 3 under the bracket 4.

FIG. 5 is a fragmentary elevational view in section taken on the line 5—5 of FIG. 2.

FIG. 6 is an elevational view of the showing of FIG. 2 from the upper right thereof and of FIG. 5 from the right end thereof.

FIG. 7 is a fragmentary front elavational view of the device of FIG. 2 in section taken on the line 7—7 of FIG. 2.

DETAILED DESCRIPTION

With reference now to the drawings, the numeral 11 generally designates the herein disclosed embodiment of the invention, which in FIG. 1 is shown schematically in a typical assemblage with a camera C and a light box B, both of known constructions. The light box B has the usual control knobs K for the usual three color-light sources. The camera C is loaded with a roll of slide-size color film. Table T provides X-Y and rotary movements.

The device 11 has a metallic base plate 12 at opposite sides of which are mounted a film-tensioning spool 13 and a feeding film-pulling spool 14. Said spools have end flanges provided with teeth 15 spaced to engage in the marginal apertures 16 of standard film F (FIG. 2). The spool 13 is rotatably supported on a shaft 17 anchored to the upstanding flange of a bracket 18 which is fastened to the base plate 12 by headed machine screws 19 and by positioning pins 20 fastened to either part and entering close-fitting bores in the other part. (Similarly functioning machine screws 19 and parts-positioning pins 20 are equivalently employed throughout the apparatus and bear the same reference numerals in the drawings.) The bracket 18 has fixed thereto an upstanding post 21 to which a lever arm 22 is pivoted for vertical swinging. On the free end of the lever 22 is mounted a roller 23 on an axis parallel to that of the spool 13. The roller 23 is pulled toward the spool 13 by a tensioned coil spring 24 with sufficient force to hold the film F with its feed apertures engaged with the teeth 15 and to provide enough frictional drag to keep the film F flat against the base plate 12 as it is pull-fed by and toward and over the spool 14.

The spool 14 is fixed to a shaft 25 which is rotatable in a pair of bearings 26 (FIG. 5) mounted in the downturned flanges of an inverted U-shaped casting 27. The bight portion of the casting 25 has a horizontally disposed extension 26 for overlapping, and for being screw-fastened to, the right edge of the base plate 12. An upstanding post 28 is fixed to the casting 27 and carries a horizontal pivot pin 29 for a medially pivoted arm 30. The arm 30 rotatably carries on its right end (FIG. 3) a horizontal-axis roller 31 which by action of the tensioned coil-spring 32 holds the film F with its apertures 16 engaged over the teeth 15 for accurate feeding and positioning of its negative frames over the light-box light opening and centered in the view field of the camera.

For accurately sequentially positioning each negative slide frame a geneva mechanism generally designated 33 is herein disclosed, but it is contemplated that an accurately controlled (e.g. by computer) stepping motor could be employed. The geneva mechanism 33 comprises a shaft 34 manually operated by a knob 35 and journaled in bearing 36. The right end of the shaft (FIG. 5) has fixed thereto a disc 37 carrying a concentric ring 38 having an approximately 45° gap therein and a pin 39 centered above the gap and approximately tangent to the imaginary circumferential arc of the gap. A co-operating disc 40 is fixed to the shaft 25 to which the spool 14 is also fixed. The disc 40 has formed thereon or fastened thereto four arcuate elements 41 which sequentially embrace the outer surface of the gapped ring 38 as the disc 37 is rotated and as the pin 39 sequentially enters and leaves each radial pin-receiving slot 42 between adjacent arcuate elements 41. Each rotation of the disc 37 produces a one-fourth rotation of the disc 40 and thus of the spool 14. Two rotations of the knob 35 produce a half rotation of the spool 14 and provide an accurate movement of one frame-spacing of the negative film.

The film-guiding mechanism also comprises a pair of metal bars 43 attached to the base plate 12 by screws 19 and by positioning pins 20. The bars 43 are undercut at 44 (FIGS. 2, 3 and 4) to provide shallow channels to embrace the edges of the film F.

The film-masking means are four thin blackened-surface rectangular elements two of which, 45 and 46, lie coplanarly in a fore-aft-oriented shallow rectangular depression 47 cut into the top surface of the base plate 12 (FIGS. 2 and 4). Masking element 45 is about four times as long as wide and is widthwise snugly slidably embraced and guided by the margins of the depression 47. The element 46 is about two-thirds as long as and is three-fifths as wide as the element 45 and snugly and guidedly fits within a same-dimensioned co-axial rectangular cut-out area opening through the near edge of the element 45 in FIG. 2. (If preferred, the masking elements 45 and 46 could be inserted and manipulated from the rear of the plate 12). Elements 45 and 46 extend forwardly sufficiently beyond the front edge of the base plate 12 to be manually grasped for adjustment to cover or expose desired areas of the negative being photographed.

The other two of the four masking elements are a pair of rectangular thin blackened plates 51 adapted to lie on the top surface of the film F and to fit guidedly snugly between the opposing faces of the bars 43 (but above the undercut channels 44). Upstanding pins 52 are manipulating handles for the plates 51.

Screw-and-pin-positioned blocks 49 retain the lateral edges of the masking element 45 in the shallow depression 47, but also serve to grip the edges of a conventional frame-mounted slide (not shown) in V-shaped grooves 53 in their opposed parallel edges (only one of which is shown in FIG. 7). The frame-mounted slide can be moved into the field of view of the camera either (1) by use of the Y-movement of the table T, or (2) very easily and accurately by the optionally added mechanism (next described) for mounting the plate 12 on the light box B.

Said plate-mounting mechanism comprises a plate 55 attachable by any suitable means (screws, adhesives, clamps, etc.) to the top of the light box B. Two parallel guide bars 57 (FIG. 3) are fixed to the top surface of the plate 55 and co-operate with two mating guide bars 59 fixed to the under surface of the plate 12. The plate 12 is bored to receive two plate-positioning pins 61, and the bars 57 are bored to receive said pins 61 to hold said plates in their two relative positions: (1) with the film F centered in the field of view of the camera C, or (2) with a frame-mounted slide in said field of view when accurately positioned in the grooves 53 in the blocks 49 (FIG. 7) and engaged against the slide-positioning flange 50 of the member 49' (FIG. 2).

The table T (FIG. 1) is a commercially available unit having a stationary base 63 and a support element 65 movable in a horizontal plane relatively thereto by threaded shafts in known manner. The hand-wheels 67, 69 and 71 drive, respectively, the Y-movement, the X-movement, and the rotary-movement shafts of the table T assemblage.

With the aid of the X-Y table, it is possible to take a picture of a frame from a film strip or mounted slide and then move the aperture area to an unexposed area and repeat the process until a slide with the correct number of images has been produced.

This apparatus can also be used to make color slides without the need to make and photograph black and white art work. A master negative would be required, however, to contain the type style needed. Using this master type strip a slide art slide could be produced one letter at a time. The correct letter to be photographed would be placed under the lens and the X-Y table would then be positioned so the letter would be positioned to the proper place on the color frame in the camera. An exposure would then be made. This process would be repeated until the complete slide is completed.

The invention having been described, what is claimed is:

1. A device for making color slides from roll-film negatives photographically made from black-and-white art-work, said device comprising: a platform-like horizontally disposed base having a medially located aperture for passing light from a color-controllable light box of known construction upwardly through said aperture, means for firmly positioning a frame of a developed-film strip over said aperture so as to be centered in the view field of a superposed known-type camera loaded with color-slide film, a pair of manually movable east-west-movable dark-surfaced flat masking plates located in a plane close to one surface plane of said frame, a pair of manually movable north-south-movable dark-surfaced flat masking plates located in another plane close to the other surface plane of said frame, and parallel plate-edge-engaging guide means for firmly holding said pairs of masking plates against movements other than their desired east-west and north-south movements, whereby different east-west and/or north-south areas of the color-slide frame being photographically produced can be sequentially exposed through said developed-film frame to different colors from said light box.

2. Structure according to claim 1 and additionally comprising in combination therewith: (1) said superposed knowntype camera loaded with color film, and (2) said color-controllable light box located beneath said base.

3. Structure according to claim 1, said last-mentioned means additionally comprising a pair of film-tensioning-and moving sprocket means, one on each side of said view field and having teeth spaced to engage the conventional spaced film-edge apertures.

4. Structure according to claim 3, said sprocket means comprising two spools, each having a sprocket at each end thereof, one spool being adapted to feed and to frictionally tensioning said film strip and the other spool being adapted to pull said film strip to and from said view field.

5. Structure according to claim 3 and additionally comprising means for stepwise accurately positioning successive film frames in said view field.

6. Structure according to claim 5, said last-mentioned means being a geneva-movement mechanism operatively connected to one of said spools.

7. Structure according to claim 1 and additionally comprising a support member positioned under and supporting said base and constructed to permit moving said base horizontally in at least one of X, Y and vertical-axis-rotary motions.

8. Structure according to claim 1 and additionally comprising a platform-like support member underlying said base and including guide means interacting between said base and said support member to provide therebetween unidirectional relative movement at right angle to the film-strip-edge-embracing-and-guiding means, and means for accurately positioning and holding a frame-mounted slide on said base for movement into the field of view of said camera by said relative movement between said base and said support member.

9. Structure according to claim 8 and further comprising means constructed and arranged to fix said base and said support member in either of their two positions for positioning either (1) an unmounted film frame or (2) a frame-mounted slide, in the field of view of said camera.

10. Structure according to claim 9, said last-mentioned means being at least one pin selectively vertically insertable into alignable apertures in said base and said support member.

* * * * *